United States Patent [19]

Tershak

[11] 3,990,417
[45] Nov. 9, 1976

[54] ELECTRONIC IGNITION SYSTEM

[75] Inventor: Andrew T. Tershak, Evansville, Ind.

[73] Assignee: Eltra Corporation, Toledo, Ohio

[22] Filed: Nov. 1, 1974

[21] Appl. No.: 519,967

[52] U.S. Cl. .......................... 123/117 R; 123/148 E
[51] Int. Cl.² ........................................... F02P 1/00
[58] Field of Search... 123/117 R, 146 TA, 148 OC, 123/148 E

[56] References Cited
UNITED STATES PATENTS

| | | | |
|---|---|---|---|
| 3,314,407 | 4/1967 | Schneider | 123/148 E |
| 3,592,178 | 7/1971 | Schiff | 123/148 E |
| 3,738,339 | 6/1973 | Huntzinger et al. | 123/146.5 A |
| 3,749,073 | 7/1973 | Asplund | 123/117 R |
| 3,809,029 | 5/1974 | Wakamatsu et al. | 123/117 R |
| 3,853,103 | 12/1974 | Wahl et al. | 123/146.5 A |
| 3,867,916 | 2/1975 | Bigalice | 123/117 R |
| 3,874,351 | 4/1975 | Asler et al. | 123/117 R |

Primary Examiner—Charles J. Myhre
Assistant Examiner—Paul Devinsky
Attorney, Agent, or Firm—Keith D. Moore

[57] ABSTRACT

The timing of ignition pulses supplied to an engine is controlled in accordance with a plurality of different operating conditions of the engine to minimize undesirable exhaust pollutants. As the speed of the engine increases from a cranking speed toward an idling speed, the ignition pulses are produced in synchronism with reference timing signals indicating movement of a piston to a top dead center position in a combustion chamber, and upon further increases in engine speed the ignition pulses are produced in synchronism with advanced timing signals generated by an electronic advance means in accordance with the approximate instantaneous position of the piston in the combustion chamber and selected engine operating conditions. The control of the timing of the ignition pulses is transferred between the two different timing signals by a selector means operating in response to control signals indicative of engine speeds above or below a predetermined speed. The control signals are produced by control means in accordance with a speed signal generated in response to the reference timing signals and compared with a reference signal representative of the predetermined speed. To prevent an ignition pulse from being interrupted by changing control signals, the selector means includes a signal processor which responds to the control signals only in accordance with a clock pulse supplied in time lagging relation to the reference timing signals used in producing the control signals.

6 Claims, 2 Drawing Figures

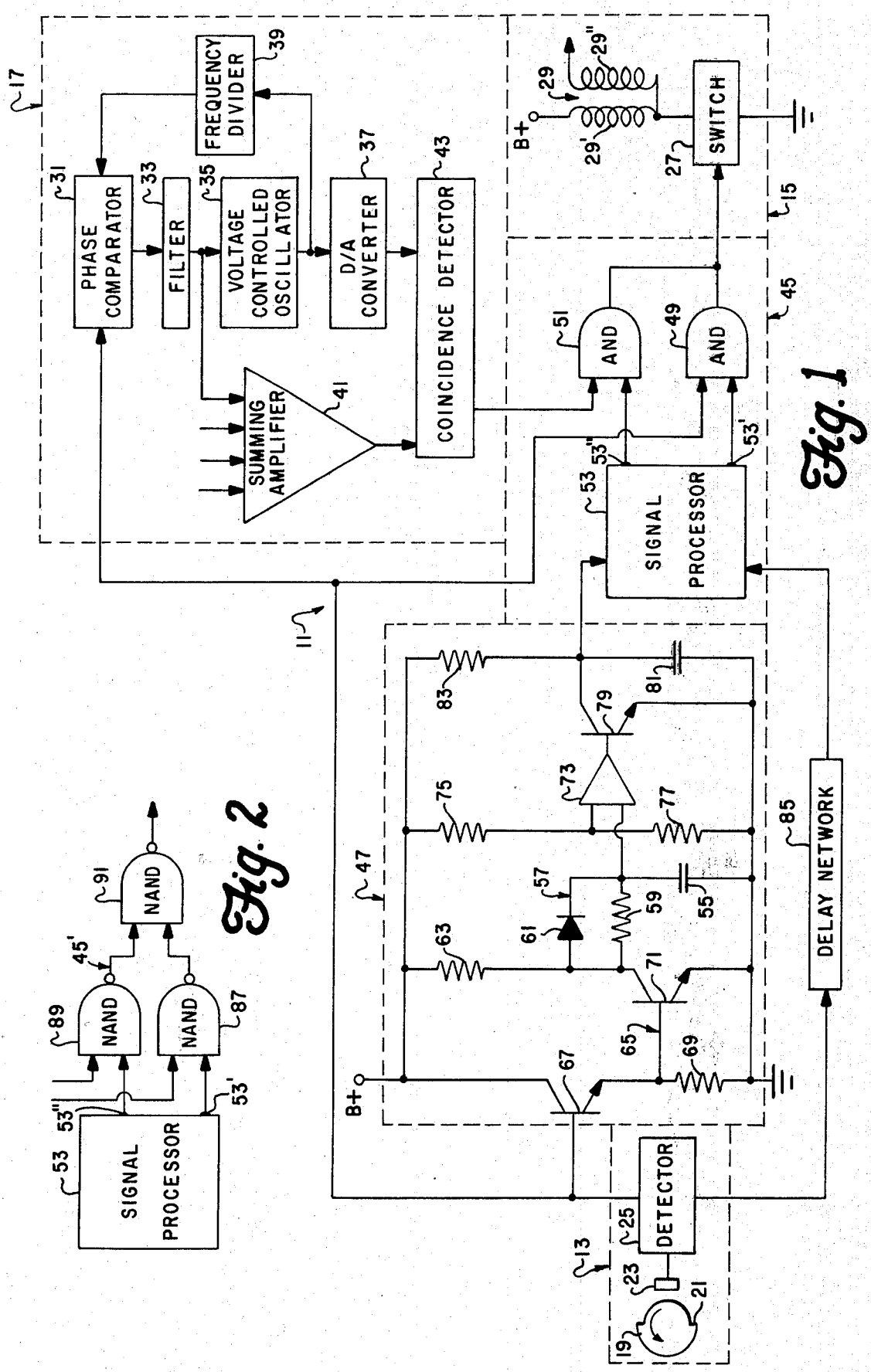

ELECTRONIC IGNITION SYSTEM

This invention relates to an electronic ignition system for an internal combustion engine, and more particularly to an ignition system having means for electronically advancing the timing of ignition pulses supplied to the engine in accordance with a plurality of operating conditions of the engine.

In operating an internal combustion engine, it is desirable to supply ignition pulses to the engine in timed relation with the movement of a piston in a combustion chamber so as to effect ignition of a combustible mixture at an optimum time for enabling the resulting propellant gases to impart a maximum driving movement to the piston. At relatively low engine speeds, for example at cranking or idling speeds, the ignition pulses may be supplied to a reciprocating engine as the piston moves to a top dead center position in the combustion chamber. However, as the speed of the engine increases, it is desirable to advance the timing of the ignition pulses relative to the movement of the piston to the top dead center position so as to continue to operate the engine efficiently.

To supply ignition pulses to the engine in timed relation with the movement of the piston, it is necessary to provide means for determining the position of the piston as it moves through the combustion chamber. In the past, this has typically been accomplished by arranging the ignition system to operate in response to the movement of a distributor mechanism which is movable in association with the piston. The ignition system typically has a switch arrangement which is actuated to produce the ignition pulses, and the switch arrangement is mechanically associated with the distributor mechanism and provided with an initial setting suitable for operating the engine at low speeds. The switch arrangement is usually in the form of conventional breaker points or a trigger wheel movable in proximity to a detector producing signals for actuating a switch mechanism. As the speed of the engine increases, the timing of the ignition pulses is advanced by shifting the relative positions of the switch arrangement and the distributor mechanism so as to vary the timing of the ignition pulses. The shifting of the switch arrangement relative to the distributor mechanism has typically been accomplished by a centrifugal mechanism rotatable relative to the distributor mechanism in response to changes in speed. In addition, a vacuum advance mechanism is usually coupled to the engine for providing a further shifting of the switch arrangement in response to variations in the load of the engine.

However, the use of mechanical mechanisms for advancing the timing of the ignition pulses has not been entirely satisfactory because of accompanying hysteresis effects which prevent the timing of the ignition pulses from varying exactly in accordance with the changing speed of the engine. Moreover, with the advent of environmental pollution standards and the resulting emission controls for automobile engines, it has become desirable to control the timing of ignition pulses in a manner minimizing the pollutants exhausted by the engine. Since the operation of the engine to reduce pollutants may be affected by the amount of exhaust gas being recirculated to the intake manifold, the temperature of the engine, the ambient air pressure, and the temperature of the incoming air, it is desirable to provide the ignition system means for responding to changes in these operating conditions. However, to utilize still more mechanical mechanisms for controlling the timing of the ignition pulses leads to an undesirably complex arrangement tending to be both costly and unreliable.

To provide a more accurate determination of the instantaneous position of the piston as it moves through the combustion chamber and to more easily control the timing of the ignition pulses in accordance with the other operating conditions of the engine as mentioned above, attention has been directed toward ignition systems utilizing electronic arrangements for advancing the timing of the ignition pulses. One such system is described, for example, in an article entitled "Electronic Spark Advance for Breakerless Ignition Systems Using Phase Locked Loop Techniques" which appears in teh IEEE 1972 Technical Digest on the twenty-third Annual Conference of Vehicular Technology. In this system, the signals provided by the initial setting of the ignition system and corresponding to the top dead center position of the piston are utilized as reference signals from which position signals are synthesized with a phase locked loop arrangement to indicate the approximate instantaneous position of the piston in the combustion chamber. This is accomplished by operating an oscillator in accordance with each reference signal to produce a multiple number of digital pulses dividing the period of time associated with the reference signals so that each digital signal corresponds to a small incremental movement of the piston.

However, for an ignition system to operate satisfactorily, it must be capabale of effectively controlling the timing of the ignition pulses throughout a range of engine speed extending from a minimum cranking speed to the maximum speed capability of the engine and for a six cylinder engine this range of speed may extend from about 30 RPM to about 5,000 RPM. Moreover, an electronic advance system with a phase locked loop arrangement is economically feasible only by using commercially available integrated circuits, and the speed range of an automobile engine may be beyond the effective control capabilities of such integrated circuits. Accordingly, it is desirable to supplement the limited range capabilities of the available phase locked loop circuits by providing the ignition system with an additional timing arrangement suitable for operating at low engine speeds, for example in a range of speed extending from the cranking speed to at least a speed requiring no advancing of the ignition pulses, such as a speed approaching an idling speed of around 600 RPM for a six cylinder engine. However, in using two different timing arrangements, it is necessary to transfer the control of the timing of the ignition pulses at an engine speed which is within the speed range of both timing arrangements. Moreover, the transfer must occur without interrupting an ignition pulse being supplied to the engine.

Accordingly, an object of the present invention is to provide means for sensing the speed of the engine and transferring the control of the timing of the ignition pulse between two different timing arrangements at a predetermined speed.

Another object of the invention is to provide means for transferring the control of the timing of ignition pulses between different timing arrangements without interrupting an ignition pulse being supplied to the engine. Still other objects, features and advantages of the present invention will become apparent to those skilled in the art from a reading of the following detailed description of a preferred embodiment of the invention, taken in conjunction with the accompanying drawing, wherein:

FIG. 1 is a schematic diagram of an electronic ignition system constructed in accordance with the present invention; and FIG. 2 is a schematic block diagram showing an alternative portion of the electronic ignition system shown in FIG. 1.

Referring now in detail to FIG. 1 of the drawing, there is shown an ignition system, generally indicated 11, for supplying ignition pulses to an engine, not shown, in timed relation with the movement of a piston in a combustion chamber. The movement of the piston is sensed by detector means, generally indicated 13, which produces reference timing signals with each movement of the piston to a reference position such as top dead center in a reciprocating engine, and at low engine speeds an ignition means, generally indicated 15, is actuated in synchronism with the reference timing signals to suppy ignition pulses to the engine. To advance the timing of the ignition pulses, the reference timing signals are supplied to an electronic advance means, generally indicated 17, which synthesizes a position signal approximating the instantaneous position of the piston and monitors selected operating conditions of the engine to produce advanced timing signals, and as the speed of the engine increases from the low engine speeds the ignition means 15 is actuated in synchronism with the advanced timing signals. The details of the engine, including the piston and the combustion chamber, have not been shown since they form no part of the present invention and may be desirably conventional. Moreover, although only a single piston is mentioned, it is to be understood that the ignition system may be used with an engine having a plurality of pistons and may further be used with different types of engines, for example a Wankel engine.

As shown, the movement of the piston in the engine is indicated by a rotatable trigger wheel 19 which is movable in association with the piston and has a periphery with a surface irregularity 21 corresponding to the reference position in the engine. The trigger wheel 19 is electrically conductive and rotating in close proximity to a sensor 23 of a detector 25 which produces a reference timing signal with each passage of the surface irregularity 21. The detector 25 may be of a type shown, for example, in U.S. Pat. Nos. 3,316,448 and 3,473,110 and produces reference timing signals having rectangular waveforms.

As also shown, the ignition means 15 may be of the inductive discharge type and includes a suitable switch 27 connecting a primary winding 29' of an ignition coil, generally indicated 29, in series with a source of potential for energizing the ignition coil 29 when the switch 27 is conductive. When the switch 27 is rendered nonconductive in response to an actuating signal, an ignition pulse is induced in a secondary winding 29" of the ignition coil 29 and supplied to the engine in the usual manner. Although the ignition means 15 is illustrated and described as an inductive discharge type, it will be appreciated that a capacitive discharge type of ignition means could also be used. Moreover, although U.S. Pat. No. 3,316,448 shows the detector 25 in combination with a capacitive discharge type of ignition circuit it will be readily apparent that the detector 25 may be used with an inductive type of ignition circuit and the above-mentioned U.S. patents may be referred to for further details of its operation.

In producing the advanced timing signals, the electronic advance means 17 receives the reference timing signals from the detector 25 and synthesizes a position signal approximating the instantaneous position of the piston. As more particularly described in the previously mentioned publication, to which reference may be made for further details, the incoming reference timing signals are received by a phase comparator 31 which passes the resulting digital signals, as will be explained below, through a filter 33 to produce a DC signal having a voltage magnitude which is representative of the frequency of the incoming digital signals. The DC signal from the filter 33 is supplied to a voltage controlled oscillator 35 which produces a series of digital pulses at a frequency corresponding to the voltage magnitude of the DC signal and at a rate considerably greater than the reference timing signals so that each of the high frequency digital signals corresponds to a small incremental movement of the piston during the time period associated with each reference timing signal.

From the voltage controlled oscillator 35, the high frequency digital signals are supplied to a digital-to-analog converter 37 which may be in the form of a counter for counting the incoming digital signals and producing a position signal having a stepped waveform which approximates the position of the piston and has a repetitive time period corresponding to the frequency of the reference timing signals. At the samem time, the high frequency digital signals from the voltage controlled oscillator 35 are supplied to the phase comparator 31 as a tracking signal by a frequency divider 39 which reduces the frequency of the digital signals to a rate comparable with the incoming reference timing signals. As the speed of the engine changes, the tracking signals are compared with the incoming reference timing signals to produce a resultant difference signal which alters the DC signal supplied to the voltage controlled oscillator 35, thereby varying the rate of the high frequency digital signals and the time period of the position signal produced by the digital-to-analog converter 37.

At the same time that the position signal is being generated, the electronic advance means 17 also produces an advance signal in accordance with a plurality of engine operating conditions. As shown, the DC signal from the filter 33, which is representative of the speed of the engine, is supplied to a summing amplifier 41 along with a plurality of other analog signals which are representative of other operating conditions of the engine. The other analog signals may be representative of the temperature of the engine, the ambient air pressure or any other selected operating conditions of the engine, and the various analog signals may be produced by suitable transducers which may be of a conventional type. The summing amplifier 41 operates to produce an advance signal having a voltage magnitude which varies in accordance with the selected operating conditions of the engine, and the resulting advance signal from the summing amplifier 41 is supplied to a coincidence detector 43 along with the position signal from the digital-to-analog converter 37. As discussed above, the position signal has a stepped waveform which is periodically repeated in accordance with the frequency of the reference timing signals and when the increasing magnitude of the position signal equals the magnitude of the advance signal, the coincidence detector 43 operates to produce an advanced timing signal.

As previously discussed, the electronic advance means 17 has a limited effective range which may not be sufficient for effectively controlling the timing of the ignition pulses throughout a full range of engine speeds. To compensate for the limited range of the electronic advance means 17, the timing of the ignition pulses may be controlled in accordance with the reference timing signals until the engine accelerates to a predetermined speed within the effective range of the electronic advance means 17 whereupon the timing of the ignition pulses may be controlled in accordance with the advanced timing signals. However, in using two different timing signals to control the timing of the ignition pulses throughout the full range of engine speeds, the ignition means 15 should be operated in synchronism with only one of the timing signals at any given time in accordance with the speed of the engine, and the control of the timing of the ignition pulses should be transferred between the two different timing signals without interrupting an ignition pulse being supplied to the engine.

In accordance with the present invention, the ignition system 11 is provided with selector means, generally indicated 45, for actuating the ignition means 15 in synchronism with either the reference timing signals or the advanced timing signals in response to control signals from a control means, generally indicated 47, which senses the speed of the engine. As shown, the selector means 45 includes a first AND gate 49 receiving the reference timing signals and a second AND gate 51 receiving the advanced timing signals, and both the AND gates 49, 51 operate to supply actuating signals to the switch 27 of the ignition means 15 upon simultaneously receiving a selector signal from a signal processor 53. As will be explained below in further detail, the signal processor 53 may be in the form of a multivibrator receiving the control signals from the control means 47 and having a pair of output terminals 53', 53'' for supplying selector signals to the AND gates 49, 51 respectively. When the signal processor 53 receives a control signal indicative of a low engine speed, a selector signal is supplied to the AND gate 49 to actuate the ignition means 15 in synchronism with the reference timing signals, and when the signal processor 53 receives a control signal indicative of an engine speed above the predetermined speed, a selector signal is supplied to the AND gate 51 to actuate the ignition means 15 in synchronism with the advanced timing signals.

In providing the signal processor 53 with control signals indicative of engine speeds above or below the predetermined speed, the control means 47 senses the speed of the engine by receiving the reference timing signal and then produces a speed signal which is compared with a reference signal representative of the predetermined engine speed. As shown, the control means 47 is energized by a suitable source of regulated voltage from which a capacitor 55 is charged, and the speed signal is produced by controlling the potential of the capacitor 55. The capacitor 55 is charged to the potential of the regulated voltage by a charging network, generally indicated 57, having a parallel connected resistor 59 and diode 61 connecting the capacitor 55 is series with another resistor 63 connected to the regulated voltage source, and the potential of the capacitor 55 is controlled by the operation of switch means, generally indicated 65, in response to the reference timing signals. As shown, the reference timing signals are applied to the base of an NPN transistor 67 which is connected in an emitter follower configuration with a resistor 69 which provides a biasing signal to the base of another NPN transistor 71 which serves as a switch connecting the junction between the resistors 59 and 63 to a ground potential so as to discharge the capacitor 55 through the resistor 59. The parallel connected resistor 59 and diode 61 enable the capacitor 55 to be charged more rapidly than it is discharged, and as the reference timing signals are received by the control means 47, the switch means 65 are alternately rendered conductive and nonconductive so that the capacitor 55 is charged to the potential of the regulated voltage and then discharged to a potential representative of the speed of the engine. As the frequency of the reference timing signals increases, less time is available to discharge the capacitor 55, and accordingly the potential to which the capacitor 55 is discharged varies with the speed of the engine providing a speed signal having a potential which increases as the engine accelerates.

To compare the speed of the engine with the predetermined speed and provide control signals indicative of engine speeds above or below the predetermined speed, the speed signal is supplied to a comparator 73 which also receives a signal representative of the predetermined speed and operates to produce the control signals. As shown, the reference signal is produced at a junction of a voltage divider formed by two serially connected resistors 75, 77 having sufficient resistance values to provide a suitable reference signal. To produce control signals indicative of whether the speed of the engine is above or below the predetermined speed, the comparator 73 is connected in controlling relation with an NPN transistor 79 for controlling the potential of a capacitor 81 providing the control signals. The capacitor 81 is connected to the regulated voltage source through a resistor 83 for being charged to the regulated potential, and the transistor 79 serves as a switch connecting the junction between the capacitor 81 and the resistor 83 to the ground potential. When the speed of the engine is below the predetermined speed, as indicated by a speed signal having a potential less than the reference signal, the comparator 73 operates to bias the transistor 79 into saturation to provide a control signal having a low potential indicative of a low engine speed. Upon acceleration of the engine to the predetermined speed, the comparator 73 operates to bias the transistor 79 nonconductive, thereby enabling the capacitor 81 to charge to the regulated potential to provide a control signal indicating an engine speed within the effective range of the electronic advance means 17.

However, to produce control signals accurately indicating the speed of the engine, it is necessary to provide the capacitor 55 with sufficient time for discharging to a potential which is representative of the speed of the engine, and to prevent an ignition pulse from being interrupted as a result of the changing control signals, it is necessary to delay the operation of the signal processor 53 until the control signals accurately indicated the speed of the engine. Although the signal processor 53 may have many different forms, one suitable arrangement may be a multivibrator which produces output signals in accordance with an incoming control signal only in response to a clock signal. Such a multivibrator may be a D-type multivibrator which is triggered by a positive going edge of a clock pulse and is described in the RCA Solid State 1974 Series Databook on cos/mos Digital Integrated Circuits on pages 68 through 73.

As previously discussed, the capacitor 55 is charged and discharged in response to the rectangular shaped reference timing signals, and accordingly the most accurate representative of the speed of the engine occurs at the end of the discharging period and the beginning of the charging period. Since the ignition pulses are produced either in synchronism with the reference timing signals at the beginning of a discharging period or in synchronism with the advanced timing signals toward the end of a charging period, the reference timing signals may be used to provide suitable clock signals to the signal processor 53 by supplying the reference timing signals to a delay network 85 which produces corresponding signals in time lagging relationship to the reference timing signals. The delay network 85 may desirably be in the form of a signal inverter effecting a 180 degree phase lag in the reference timing signals. Although a D-type multivibrator has been used in describing the signal processor 53, it is to be understood that other devices may be used and if an additional time delay is required then the inverted timing signals may be used to trigger a monostable multivibrator having a suitable relaxation time period providing the additional time delay. Alternatively, if the signal processor 53 is in the form of a device which is triggered by a negative-going edge of a clock pulse, and requires a time delay then the reference timing signals may be used without inversion to trigger a suitable monostable multivibrator.

Although the selector means 45 has been illustrated in FIG. 1 as being formed with AND gates 49, 51, the selector means 45 may also be formed with NAND gates as shown in FIG. 2 in an alternative embodiment, generally indicated 45'. As shown, the reference timing signals are received by a first NAND gate 87 while the advance timing signals are received by a second NAND gate 89, and the output timing signals produced by both NAND gates 87, 89 are supplied to third NAND gate 91 which operates to supply actuating signals to the switch 27 of the ignition means 15. As previously described, the signal processor 53 produces selector signals at either one of two output terminals in accordance with the control signals indicative of the speed of the engine with the selector signal from the first output terminal being supplied to the first NAND gate 87 and the selector signal from second output terminal being supplied to the second NAND gate 89.

As discussed above, when the speed of the engine is below the predetermined speed, the signal processor 53 responds to a control signal from the control means 47 to supply a selector signal to the NAND gate 87 while causing the NAND gate 89 to supply a holding signal to the NAND gate 91 which will not vary in response to the advance timing signals. At the same time the NAND gate 87 supplies output timing signals to the NAND gate 91 in synchronism with the reference timing signals which responds by supplying corresponding actuating signals to the ignition means 15. Upon acceleration of the engine to the predetermined speed, the signal processor 53 responds to a different control signal to supply a selector signal to the NAND gate 89 while at the same time inhibiting the NAND gate 87 from responding to the reference timing signals and causing it to supply a constant output signal to the NAND gate 91. As the advance timing signals are received by the NAND gate 89, it supplies output timing pulses to the NAND gate 91 in synchronism with the advanced timing signals which in turn supplies corresponding actuating signals to the ignition means 15.

What is claimed is:
1. An ignition system, comprising:
   ignition means operable in response to an actuating signal for supplying an ignition spark to an engine having a piston movable in a combustion chamber,
   detector means generating a reference timing signal indicative of each movement of the piston to a reference position in the engine,
   advance means receiving the reference signals and being operable in response thereto over an effective range of engine speeds including a predetermined idling speed and extending to higher engine speeds fo generating advanced timing signals in time leading relation to the reference timing signals,
   selector means receiving the reference timing signals and the advanced timing signals and being connected in controlling relation with said ignition means,
   control means receiving the reference timing signals and being operable in response thereto independently of said advance means and over a different range of engine speeds including cranking speeds and extending therefrom beyond the predetermined idling speeds for producing a first control signal as the engine accelerates to a predetermined speed and producing a second control signal at engine speeds above the predetermined speed,
   said control means comprising:
   speed sensing means including a capacitor and a charging network for charging the capacitor to a reference potential and switch means responsive to each reference timing signal for effecting alternate charging of the capacitor to the reference potential and then discharging the capacitor to a potential providing a speed signal representative of the speed of the engine,
   reference means producing a reference signal representative of the predetermined engine speed,
   comparison means operable in response to the speed signal and the reference signal for effecting the first control signal as the engine accelerates to the predetermined speed and effecting the second control signal at engine speeds above the predetermined speed,
   said selector means being responsive to the first control signal for supplying actuating signals to said ignition means in synchronism with the reference timing signals and responsive to the second control signal for supplying actuating signals to the ignition means in synchronism with the advanced timing signals,
   said selector means including signal processor means receiving the control signals from said speed sensing means and being operable in response to a clock pulse for producing selector signals determining the timing of the operation of said ignition means, and
   clock means responsive to the reference timing signals for supplying clock pulses to said signal processor means when said switch means reverses from discharging to charging the capacitor.

2. An ignition system according to claim 1, wherein said charging network includes:

a first resistor connected to a source of reference potential and to said switch means, and a second resistor connecting said capacitor in series with said first resistor for enabling said capacitor to discharge through said switch means upon conduction by said switch means, and a diode connected in parallel with said second resistor for charging said capacitor at a rate faster than its discharge upon nonconduction by said switch means.

3. An ignition system according to claim 1, wherein said clock means comprises delay means responsive to the reference timing signals for producing corresponding delayed timing signals in time lagging relation to the reference timing signals.

4. In an ignition system according to claim 1:

said signal processor means being a D-type multivibrator providing a selector signal at a first output terminal in response to the first control signal and providing a selector signal at a second output terminal in response to the second control signal, first AND gate means receiving the reference timing signals and being operable in response to receiving a selector signal from said first output terminal for supplying actuating signals to said ignition means in synchronism with the reference timing signals, and second AND gate means receiving the advanced timing signals and being operable in response to a selector signal from the second output terminal for supplying actuating signals to said ignition means in synchronism with the advanced timing signals.

5. An ignition system according to claim 1, wherein said selector means further comprises:

said signal processor means being a D-type multivibrator proving a selector signal at a first output terminal in response to the first control signal and providing a selector signal at a second output terminal in response to the second control signal, a first NAND gate receiving the reference timing signals and the signals from the first ouput of the signal processor and being operable in response to a selector signal for producing an output timing signal in synchronism with the reference timing signals, a second NAND gate receiving the advanced timing signals and the signals from the second output of said signal processor means and being operable in response to a selector signal for producing an output timing signal in synchronism with the advanced timing signals, and a third NAND gate operable in response to the output timing signals from said first and second NAND gate means for supplying actuating signals to said ignition means.

6. An ignition system, comprising:

ignition means operable in response to an actuating signal for supplying an ignition spark to an engine having a piston movable in a combustion chamber, detector means generating a reference timing signal indicative of each movement of the piston to a reference position in the engine, advance means responsive to the reference timing signal for generating advanced timing signals in time leading relation to the reference timing signals, selector means receiving the reference timing signals and the advanced timing signals and being connected in controlling relation with said ignition means, control means operable in response to the reference timing signals for producing a first control signal as the engine accelerates to a predetermined speed and producing a second control signal at engine speeds above the predetermined speed, said control means comprising:

speed sensing means including a capacitor and a charging network for charging the capacitor to a reference potential and switch means responsive to each reference timing signal for discharging the capacitor to a potential providing a speed signal representative of the speed of the engine, reference means producing a reference signal representative of the predetermined engine speed, and comparison means operable in response to the speed signal and the reference signal for effecting the first control signal as the engine accelerates to the predetermined speed and effecting the second control signal at engine speeds above the predetermined speed, said selector means being responsive to the first control signal for supplying actuating signals to said ignition means in synchronism with the reference timing signals and responsive to the second control signal for supplying actuating signals to the ignition means in sychronism with the advanced timing signals, said selector means including signal processor means receiving the control signals from said speed sensing means and being operable in response to a clock pulse for producing the selector signals determining the timing of the operation of said ignition means, clock means responsive to the reference timing signals for supplying clock pulses to said signal processor means after a period of time enabling said capacitor of said speed sensing means to be discharged to a potential indicative of the speed of the engine, said clock means comprises delay means responsive to the reference timing signals for producing corresponding delayed timing signals in time lagging relation to the reference timing signals, and said delay means being an inverter for producing delayed timing signals in phase displaced relation to the reference timing signals.

* * * * *